United States Patent Office 2,777,825
Patented Jan. 15, 1957

---

2,777,825
CELLULOSIC PLASTIC COMPOSITIONS

Maurice Louis Auguste Fluchaire and Jean Auguste Phélisse, Lyon, France, assignors to Societe des Usines Chimiques Rhone-Poulenc, Paris, France, a French body corporate No Drawing. Application April 6, 1953,
Serial No. 347,158

Claims priority, application France April 10, 1952

9 Claims. (Cl. 260—17)

This invention relates to compositions which may be dyed with acid dyes and with metalliferous dyes and to processes for their production.

It is known that cellulosic plastics may be dyed with resin-soluble dyestuffs or with vat dyes but have no affinity for acid dyes or for metalliferous dyes such as chrome dyes which are used for the dyeing of wool.

It is highly desirable to be able to dye cellulosic plastics in admixture with wool by means of the same class of dyes. It has already been proposed to impart to cellulosic plastics an affinity for dyes used for the dyeing of wool by incorporating therein polymers or copolymers formed from a polymerisable amino ester.

It is an object of this invention to provide novel compositions capable of being dyed with acid dyes and with metalliferous dyes. It is a further object of the invention to provide a process for the production of the said compositions. It is a still further object of the invention to provide such compositions in the form of filaments, threads and the like having the aforesaid property of being capable of being dyed with acid dyes and with metalliferous dyes. Other objects of the invention will hereinafter appear.

According to the present invention, a composition capable of being dyed with acid dyes and with metalliferous dyes comprises an intimate mixture of a cellulose ether or cellulose ester and a polymeric aminoethyl vinyl ether as hereinafter defined or acid salt thereof.

It has now been discovered, and this forms the basis of the present invention, that by dispersing the cellulose ether or cellulose ester and the said polymeric aminoethyl vinyl ether in a common liquid dispersion medium to form a true solution or a fine suspension, there are obtained, after removal of the liquid dispersion medium as by evaporation, compositions which, like wool, may be dyed with acid dyes or with metalliferous dyes such as chrome dyes, the results as to depth of colour and fastness being at least equivalent to those produced when the cellulose ether or cellulose ester is modified by the incorporation therein of a polymer or copolymer obtained from a polymerisable amino ester.

By way of example, as cellulose ether there may be employed ethyl cellulose, and as cellulose ester there may be employed the acetate, butyrate, propionate or acetobutyrate.

By "polymeric aminoethyl vinyl ethers" is meant the basic polymers of aminoethyl vinyl ethers of the formula:

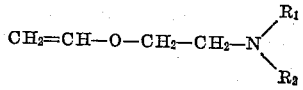

in which $R_1$ and $R_2$ represent hydrogen atoms or the same or different saturated or unsaturated aliphatic hydrocarbon radicals, or together with the adjacent nitrogen atoms constitute a heterocyclic ring, these polymers corresponding substantially to the formula:

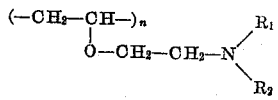

in which $R_1$ and $R_2$ have the significance indicated above and $n$ is a whole number greater than 1. Among these products, the polymers of the vinyl ethers of dimethylaminoethanol, diethylaminoethanol and of N-hydroxyethylpyrrolidine are of particular value. These polymers are suitably obtained by polymerising the monomeric material with the aid of boron trifluoride. Two or more of these vinyl ethers may in this manner be copolymerised, and the copolymeric vinyl ether incorporated in the cellulose ether or cellulose ester.

These polymers or copolymers may be used as such, or in the form of an acid salt formed with a mineral or organic acid such as perchloric acid, fluoboric acid, sulphuric acid, formic acid, acetic acid or trichloracetic acid.

The relative proportions of the cellulose ether or ester and of the polymeric ether may vary. However, it is generally preferred to employ the polymeric ether in a proportion of from 1% to 20% by weight of the cellulose ether or ester and more particularly from 3% to 12% by weight. With less than 1% of the polymeric ether, the affinity of the products for acid or metalliferous dyes decreases progressively, while it is not generally desirable to employ more than 12% by weight of the polymeric ether.

The cellulose ether or ester and the polymeric ether may be brought into solution or suspension in a suitable liquid dispersion medium, either in the cold or by heating. The cellulose ether or ester may be suspended in a cold solution of the polymeric ether, or acid salt of such ether, and then heated until a viscous solution or gel is obtained. A plasticiser may also be added to the solution of polymeric ether if desired.

Filaments, threads, films, plastic masses and the like may be obtained from the dispersions by eliminating the liquid dispersion medium, as for example by evaporation. Filaments may be prepared either by the wet spinning process or by the dry spinning process. The products thus obtained have an excellent affinity for dyes and are capable of fixing acid dyes, chrome dyes or other metalliferous dyes in the same way as wool. In particular cellulosic fibres according to the invention may be associated with wool to give mixed fabrics which dye uniformly with acid or metalliferous dyestuffs to give dyeings having excellent resistance to washing.

The following examples will serve to illustrate the invention but are not to be regarded as limiting it in any way. The parts are given by weight.

Example 1

A viscous solution is prepared by mixing together 24 parts of cellulose acetate containing 54.5% of combined acetic acid, 1.2 parts of polymeric vinyl diethylaminoethyl ether, and 74.8 parts of acetone.

The viscous solution is spun under the usual conditions adopted in the dry spinning of cellulose acetate as to produce a 100 denier yarn comprising 32 fibres. After finishing in the normal way for cellulose acetate yarns, the yarn is treated for 1 hour at 97°–98° C. in 50 times its weight of a solution containing 1 cc. of formic acid per litre and an amount of Cyanol extra

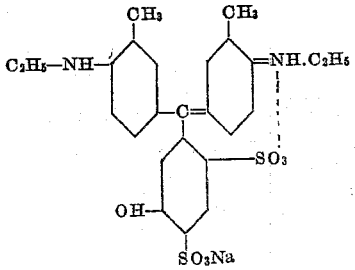

(No. 828 of Schultz's Farbstofftabellen), equal to 2% of the weight of the yarn. Yarn obtained from the same cellulose acetate under the same spinning conditions, but without any addition of polymeric ether, is treated in the bath at the same time.

The yarn containing the polymeric ether addition is dyed an intense blue colour, while the unmodified yarn remains completely white. The blue coloration of the yarn in accordance with the invention is uniformly distributed throughout the thickness of the fibres.

*Example 2*

A viscous solution is prepared by mixing together 24 parts of cellulose acetate containing 54.5% of combined acetic acid, 1.2 parts of polymeric vinyl dimethylaminoethyl ether, and 74.8 parts of acetone.

The viscous solution is spun, and the yarn thus prepared is dyed, as described in Example 1. The yarn acquires a deep blue tint.

*Example 3*

A viscous solution is prepared by mixing together 95 parts of cellulose acetate, 5 parts of polymeric vinyl dimethylaminoethyl ether, and 610 parts of acetone.

From the resulting viscous solution a film is prepared. The film is introduced into a dye bath containing, per litre, 0.5 cc. of glacial acetic acid and 0.5 g. of a dye as used in Example 1. The temperature of the dye bath is raised to 97°–98° C. on a boiling water bath within 15 minutes, and the dye bath is maintained at this temperature for a further 15 minutes. Sulphuric acid (5%) is then added in the proportion of 0.5 cc. of $H_2SO_4$ (66° Bé.) per litre of dye bath solution, and the temperature of the solution is maintained at 97°–98° C. for a further 30 minutes. The film is then rinsed and washed in boiling water until it no longer colours the washing water. It has a deep blue coloration.

*Example 4*

A viscous solution is prepared by mixing together 95 parts of cellulose acetate, 5 part sof polymeric vinyl diethylaminoethyl ether, and 610 parts of acetone.

From the resulting solution a film is prepared which is dyed as described in Example 3 to a beautiful blue coloration.

We claim:

1. A composition capable of being dyed with acid dyes and with metalliferous dyes which comprises an intimate admixture of a cellulose derivative selected from the group consisting of a cellulose ether and a cellulose ester and a polymeric ether selected from the group consisting of the basic polymers of aminoethyl vinyl ethers of the formula:

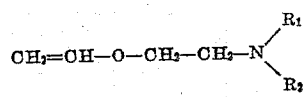

and their acid salts where $R_1$ and $R_2$ when taken separately are each selected from the class consisting of hydrogen atoms, methyl and ethyl groups and when taken together constitute a —$CH_2$—$CH_2$—$CH_2$—$CH_2$— chain, said polymeric ether being present in a proportion of 1 to 20% by weight of the acid cellulose derivative.

2. A process for the production of a shaped solid polymeric composition capable of being dyed with acid dyes and with metalliferous dyes which comprises mixing together a solution in acetone of a cellulose derivative selected from the group consisting of a cellulose ether and a cellulose ester and a solution in acetone of a polymeric ether selected from the group consisting of the basic polymers of aminoethyl vinyl ethers of the formula:

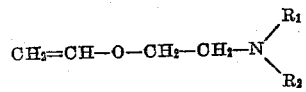

and their acid salts where $R_1$ and $R_2$ when taken separately are each selected from the class consisting of hydrogen atoms, methyl and ethyl groups and when taken together constitute a —$CH_2$—$CH_2$—$CH_2$—$CH_2$— chain, the said polymeric ether being present in a proportion of 1 to 20% by weight of the said cellulose derivative, shaping the said mixture and thereafter removing acetone therefrom.

3. Filaments, threads and films formed of a composition capable of being dyed with acid dyes and with metalliferous dyes and which comprises an intimate admixture of a cellulose derivative selected from the group consisting of a cellulose ether and a cellulose ester, and a polymeric ether selected from the group consisting of the basic polymers of the aminoethyl vinyl ethers of the formula:

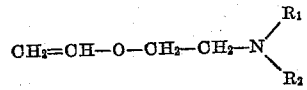

and their acid salts where $R_1$ and $R_2$ when taken separately are each selected from the class consisting of hydrogen atoms, methyl and ethyl groups and when taken together constitute a —$CH_2$—$CH_2$—$CH_2$—$CH_2$— chain, said polymeric ether being present in a proportion of 1 to 20% by weight of the said cellulose derivative.

4. A composition capable of being dyed with acid dyes and with metalliferous dyes which comprises an intimate admixture of cellulose acetate and a polymeric vinyl ether of diethylaminoethanol, said polymeric ether being present in a proportion of 1 to 20% by weight of the said cellulose acetate.

5. A composition capable of being dyed with acid dyes and with metalliferous dyes which comprises an intimate admixture of cellulose acetate and a polymeric vinyl ether of dimethylaminoethanol, said polymeric ether being present in a proportion of 1 to 20% by weight of the said cellulose acetate.

6. A composition capable of being dyed with acid dyes and with metalliferous dyes which comprises an intimate admixture of cellulose acetate and a polymeric vinyl ether of N-hydroxyethylpyrrolidine, said polymeric ether being present in a proportion of 1 to 20% by weight of the said cellulose acetate.

7. A process for the production of a shaped solid polymeric composition capable of being dyed with acid dyes and with metalliferous dyes which comprises dispersing in acetone an intimate admixture of cellulose acetate and a polymeric vinyl ether of diethylaminoethanol, said polymeric ether being present in a proportion of 1 to 20% by weight of the said cellulose acetate, shaping the said dispersion and thereafter removing acetone from the shaped dispersion.

8. A process for the production of a shaped solid polymeric composition capable of being dyed with acid dyes and with metalliferous dyes which comprises dispersing in acetone an intimate admixture of cellulose acetate and a polymeric vinyl ether of dimethylaminoethanol, said polymeric ether being present in a proportion of 1 to 20% by weight of said cellulose acetate, shaping the said dispersion and thereafter removing acetone from the shaped dispersion.

9. A process for the production of a shaped solid polymeric composition capable of being dyed with acid dyes and with metalliferous dyes which comprises dispersing in acetone an intimate admixture of cellulose acetate and a polymeric vinyl ether of N-hydroxyethylpyrrolidine, said polymeric ether being present in a proportion of 1 to 20% by weight of the said cellulose acetate, shaping the said dispersion and thereafter removing acetone from the shaped dispersion.

References Cited in the file of this patent
UNITED STATES PATENTS 2,168,336   Heckert ---------------- Aug. 8, 1939